United States Patent
Bulan

(10) Patent No.: US 10,978,712 B2
(45) Date of Patent: *Apr. 13, 2021

(54) PROCESS FOR THE MANUFACTURE OF GAS DIFFUSION ELECTRODES

(75) Inventor: Andreas Bulan, Langenfeld (DE)

(73) Assignee: Covestro Deutschland AG, Leverkusen (DE)

( * ) Notice: Subject to any disclaimer, the term of this patent is extended or adjusted under 35 U.S.C. 154(b) by 1084 days.

This patent is subject to a terminal disclaimer.

(21) Appl. No.: 11/437,171

(22) Filed: May 19, 2006

(65) Prior Publication Data

US 2006/0263232 A1 Nov. 23, 2006

(30) Foreign Application Priority Data

May 21, 2005 (DE) ...................... 10 2005 023 615.4

(51) Int. Cl.
| | |
|---|---|
| H01M 4/86 | (2006.01) |
| H01M 4/90 | (2006.01) |
| B22F 7/00 | (2006.01) |
| H01M 4/88 | (2006.01) |
| B22F 3/02 | (2006.01) |
| C25B 11/03 | (2021.01) |
| H01M 8/083 | (2016.01) |
| H01M 4/04 | (2006.01) |

(52) U.S. Cl.
CPC ........... *H01M 4/8605* (2013.01); *B22F 7/004* (2013.01); *C25B 11/035* (2013.01); *H01M 4/8807* (2013.01); *H01M 4/9016* (2013.01); *H01M 8/083* (2013.01); *B22F 3/02* (2013.01); *H01M 4/0404* (2013.01); *Y02P 70/50* (2015.11)

(58) Field of Classification Search
CPC ......... C25B 11/00; C25B 11/04; C25B 11/06; C25B 11/08; B22F 3/02; B22F 3/18; B22F 2003/023; B22F 2003/185
USPC .......... 75/746, 770, 772, 247; 419/9, 32, 33, 419/61, 62, 65–69; 148/513; 361/500–541

See application file for complete search history.

(56) References Cited

U.S. PATENT DOCUMENTS

| | | | | |
|---|---|---|---|---|
| 3,244,515 A | * | 4/1966 | Grune et al. ........................ 419/2 |
| 3,663,303 A | * | 5/1972 | Dietz .................. H01M 4/8842 |
| | | | | 502/101 |
| 3,840,407 A | * | 10/1974 | Yao ..................... H01M 12/065 |
| | | | | 429/101 |
| 4,129,633 A | * | 12/1978 | Biddick ....................... 264/40.3 |
| 4,175,055 A | * | 11/1979 | Goller et al. ................. 502/101 |
| 4,383,010 A | * | 5/1983 | Spaepen ............. H01M 4/8896 |
| | | | | 264/117 |
| 4,602,426 A | | 7/1986 | Kampe |
| 4,892,637 A | | 1/1990 | Sauer et al. |
| 4,927,514 A | * | 5/1990 | Solomon .................. C25B 1/13 |
| | | | | 204/242 |
| 5,676,808 A | | 10/1997 | Nishiki |
| 5,693,202 A | | 12/1997 | Gestermann et al. |
| 5,981,105 A | * | 11/1999 | Smith ..................... H01M 4/06 |
| | | | | 429/206 |
| 6,838,408 B2 | * | 1/2005 | Bulan et al. .................. 502/101 |
| 2004/0083589 A1 | * | 5/2004 | Steinfort .............. B22F 3/1103 |
| | | | | 29/25.03 |
| 2004/0152588 A1 | | 8/2004 | Janowitz et al. |
| 2004/0245095 A1 | * | 12/2004 | Pinter ....................... C25B 9/08 |
| | | | | 204/265 |
| 2005/0079599 A1 | | 4/2005 | Bulan et al. |

FOREIGN PATENT DOCUMENTS

| | | | | |
|---|---|---|---|---|
| DE | 37 10 168 | | 10/1988 | |
| DE | 44 44 114 | | 9/1996 | |
| DE | 196 47 534 | | 5/1998 | |
| DE | 101 30 441 | | 3/2003 | |
| DE | 101 48 599 | | 4/2003 | |
| EP | 0144002 | * | 6/1985 | .............. H01M 4/98 |
| EP | 0277332 | * | 8/1988 | .............. H01M 4/00 |
| EP | 0 297 377 | | 1/1989 | |
| GB | 1419785 A | * | 12/1975 | .............. H01M 4/04 |
| WO | WO-03/044245 | | 5/2003 | |
| WO | WO-03036741 A2 | * | 5/2003 | .............. C25B 9/08 |

OTHER PUBLICATIONS

Trechsel, Heinz R., Moisture Control in Buildings, pp. 283-290 (1994).*
Atiemo-Obeng, Victor A.; Penney, W. Roy; Armenante, Piero; "Solid-Liquid Mixing," Chapter 10, pp. 543-557, Handbook of Industrial Mixing, Science and Practice, edited by Edward L. Paul, Victor A. Atiemo-Obeng, Suzanne M. Kresta, 2004.*
Computer-Generated Translation of EP 0 144 002, published originally on Jun. 12, 1985.*
Computer-Generated Translation of EP 0 277 332, published originally on Aug. 10, 1988.*
Muzzio et al., "Solids Mixing," Handbook of Industrial Mixing, Science and Practice, Ch. 15, pp. 887-985, 2004.*

* cited by examiner

*Primary Examiner* — Vanessa T. Luk

(74) *Attorney, Agent, or Firm* — Faegre Drinker Biddle & Reath

(57) ABSTRACT

The invention describes a process for the manufacture of a gas diffusion electrode involving preparing a powder mixture containing at least a catalyst and a binder, applying the powder mixture to an electrically conducting support, and pressing the powder mixture with the electrically conducting support.

14 Claims, No Drawings

PROCESS FOR THE MANUFACTURE OF GAS DIFFUSION ELECTRODES

FIELD OF THE INVENTION

The invention relates to a process for the manufacture of gas diffusion electrodes from an electrically conducting support and a powder mixture at least containing a catalyst and a binder. The gas diffusion electrodes are suitable e.g. for sodium chloride electrolysis or for alkaline fuel cells.

BACKGROUND OF THE INVENTION

It is known from DE 3 710 168 A and EP 297 377 A to manufacture gas diffusion electrodes by first rolling a dry powder mixture, containing a catalyst and a binder and optionally other constituents, to form a sheet material, and then applying the latter to an electrically conducting support by rolling. Apart from its mechanical function, the support also serves to carry current into and out of the gas diffusion electrode. The mechanical support can be, e.g., a metal gauze or a non-woven or woven metal fabric. The sheet material can be applied to the support, e.g., by pressing or rolling.

One disadvantage of these processes is that they require two operating steps. In a first operating step the powder mixture, containing a catalyst, a binder and optionally other constituents, is pressed to form a sheet material, and in a second operating step the latter is pressed with the support. Another disadvantage is that, during the pressing of the sheet material with the support, the catalytically active sheet material is again subjected to a high mechanical stress. This has an adverse effect on the pore system of the catalytically active layer of the gas diffusion electrode, consequently impairing the electrode's electrochemical activity It is known from DE 101 30 441 A to avoid destruction of the pore system during pressing by filling the powder mixture with a liquid.

According to DE 101 48 599 A the forces during pressing of the sheet material with the support must be adjusted very precisely in order to avoid damaging the sheet material. It is therefore difficult to produce an optimal pore structure.

The magnitude of the force during pressing of the powder mixture has to be chosen so as to produce a sheet material of adequate mechanical stability. Likewise, during pressing of the sheet material with the support, the magnitude of the force has to be chosen so as to produce a sufficiently strong bond (clamping) between the sheet material and the support. If the pressing force is too small, the sheet material can easily separate from the support while the gas diffusion electrode is in use, e.g., in an electrolysis cell. Also, if the pressing force is too small, the electrical contact produced between the sheet material and the support may be inadequate. This creates an additional resistance, thereby increasing the electrolysis voltage.

Another disadvantage of the processes known from the state of the art is that only single-layer gas diffusion electrodes can be manufactured. A single-layer gas diffusion electrode is understood as meaning an electrode having one catalytically active layer. However, gas diffusion electrodes can also have a multilayer structure, i.e., contain several layers. In this case, the layers can have different properties, e.g. different hydrophobic, hydrophilic or electrical properties. Multilayer gas diffusion electrodes cannot be manufactured by the processes known in the art because pressing is incapable of bonding several layers to one another and to the electrically conducting support with sufficient rigidity.

SUMMARY OF THE INVENTION

The present invention therefore provides a process for the manufacture of a gas diffusion electrode which is as simple as possible and produces a gas diffusion electrode with outstanding electrochemical properties. The inventive process also makes it possible to manufacture both single-layer and multilayer gas diffusion electrodes.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

The present invention provides a process for the manufacture of a gas diffusion electrode which involves the following:

(a) preparing a powder mixture containing at least a catalyst and a binder,
(b) applying the powder mixture to an electrically conducting support, and
(c) pressing the powder mixture with the electrically conducting support.

In contrast to the processes known in the art, the powder mixture in the process according to the invention, containing the catalyst and the binder and optionally other components, is applied directly to the electrically conducting support and then pressed with the support. This saves one operating step, because the powder mixture is not initially pressed to form a sheet material before the latter is pressed with the support.

The powder mixture contains at least a catalyst and a binder. The catalyst used may be a metal, a metal compound, a non-metallic compound or a mixture of metals, metal compounds or non-metallic compounds. The catalyst is preferably silver, silver (I) oxide, silver (II) oxide or mixtures thereof. The binder is preferably a polymer and most preferably polytetrafluoroethylene (PTFE). It is preferable to use powder mixtures containing 70 to 95 wt. % of silver(I) oxide, 0 to 15 wt. % of powdered silver metal and 3 to 15 wt. % of PTFE. The powder mixture used can also be a mixture such as that known, e.g., from DE 101 30 441 A, where the catalyst, e.g., silver, is precipitated on a PTFE substrate.

The powder mixture can additionally contain other components, e.g. fillers, containing powdered nickel metal, Raney nickel, Raney silver or mixtures thereof.

After application to the support and pressing with the support, the powder mixture containing a catalyst and a binder forms an electrochemically active layer of the gas diffusion electrode.

Preparation of the powder mixture according to (a) is effected by mixing the powdered catalyst and binder and optionally other components. This preferably takes place in a mixing device having rapidly rotating mixing elements, e.g., fly cutters. To mix the components of the powder mixture, the mixing elements preferably rotate at a speed of 10 to 30 m/s or at a speed of rotation of 4000 to 8000 rpm. If the catalyst, e.g., silver (I) oxide, is mixed in such a mixing device with PTFE as binder, the PTFE is drawn into a thread-like structure and thus acts as binder for the catalyst. After mixing, the powder mixture is preferably sieved. Sieving is preferably effected with a sieving device equipped with gauzes or the like having a mesh size of 0.1 to 1.5 mm, more preferably of 0.2 to 1.2 mm.

In another embodiment of the inventive process, after the catalyst and the binder have been mixed in the mixing device, the powder mixture is compacted, for example, by being pressed with rollers. The scabs formed in this way are then processed to a powder again in a mixing device with rotating mixing elements. This reduces the oversize material and improves the flowability. This procedure, i.e., the mixing of the constituents of the powder mixture in a mixing device, the compaction, of the powder mixture and the subsequent remixing in a mixing device, can be repeated several times.

Mixing in the mixing device with rotating mixing elements introduces energy into the powder mixture, which heats up considerably. It has been found that, on mixing, the powder mixture should not heat up too much because otherwise the electrochemical activity of the gas diffusion electrode is impaired, i.e. the voltage during the electrolysis operation increases. Mixing is therefore carried out at a temperature preferably of 35 to 80° C. and more preferably of 40 to 55° C. This can be done by cooling during mixing, e.g., by adding a coolant such as liquid nitrogen or other inert heat-absorbing substances. Another possible way of controlling the temperature is to interrupt the mixing so as to allow the powder mixture to cool down.

In another embodiment of the inventive process, where silver(I) oxide is used as catalyst, it is advantageous for the electrochemical activity of the gas diffusion electrode if the room temperature is preferably 14 to 23° C., more preferably 16 to 20° C., and the relative humidity is preferably 30 to 60%, more preferably 35 to 55%, during the preparation of the powder mixture, i.e., during mixing, sieving and optionally compaction. If the temperature and relative humidity are higher, an impairment of the electrochemical activity of the gas diffusion electrode is observed during the electrolysis operation.

In the next process step (b) after the preparation of the powder mixture according to step (a), the powder mixture is applied to an electrically conducting support. This can be a gauze, non-woven fabric, foam, woven fabric, net, expanded metal or the like. The support is preferably metal and preferably nickel, silver or silvered nickel. The support may be single-layer or multilayer. A multilayer support may be built up of two or more gauzes, non-woven fabrics, foams, woven fabrics, nets, expanded metals or the like, arranged one on top of the other. The gauzes, non-woven fabrics, foams, woven fabrics, nets, expanded metals or the like may be different here. For example, they may have different thicknesses or porosities or a different mesh size. Two or more gauzes, non-woven fabrics, foams, woven fabrics, nets, expanded metals or the like may be bonded together by e.g. sintering or welding. It is preferable to use a nickel gauze with a wire diameter of 0.05 to 0.4 mm, more preferably of 0.1 to 0.30 mm, and a mesh size of 0.2 to 1.2 mm.

The application of the powder mixture to the electrically conducting support according to step (b) may preferably be effected by sprinkling. The powder mixture can be sprinkled onto the support through a sieve, for example. Particularly advantageously, a frame-like template is laid on the support, the template preferably being chosen so that it just encompasses the support. Alternatively, the template can also be chosen to be smaller in area than the support, in which case an uncoated edge of the support, free of electrochemically active coating, remains after the powder mixture has been sprinkled on and pressed with the support. The thickness of the template can be chosen according to the amount of powder mixture to be applied to the support. The template is filled with the powder mixture. Excess powder can be removed with a stripper. The template is then removed.

In the subsequent (c) the powder mixture is pressed with the support. This can be done especially using rollers and preferably a pair of rollers. However, it is also possible to use a roller on a substantially flat base, either the roller or the base being moved. The pressing can also be effected by means of a pressure ram. The pressing forces are preferably from 0.01 to 7 kN/cm.

As distinct from processes such as those known in the art, e.g., DE 101 48 599 A, the pressing in the process according to the invention is independent of the material, the surface roughness of the rollers and the diameter of the rollers used for pressing.

Another advantage of the process according to the present invention is that it makes it possible to manufacture not only single-layer but also multilayer gas diffusion electrodes. To manufacture multilayer gas diffusion electrodes, powder mixtures of different compositions and different properties are applied in layers to the electrically conducting support. In this process the layers of different powder mixtures are not pressed individually with the support, but first applied in succession and then pressed altogether with the support in one step. For example, it is possible to apply a layer of a powder mixture which has a higher binder content, especially a higher PTFE content, than the electrochemically active layer. Such a layer with a high PTFE content of 10 to 50% can act as a gas diffusion layer. A layer of PTFE may also be applied as a gas diffusion layer. For example, a layer with a high PTFE content may be applied directly to the support as the bottom layer. Other layers of different composition may be applied to produce the gas diffusion electrode. In the case of multilayer gas diffusion electrodes, the desired physical and/or chemical properties can be specifically adjusted. These include inter alia the hydrophobicity or hydrophilicity of the layer, the electrical conductivity and the gas permeability. In this way it is possible, for example, to build up a gradient of a property by increasing or decreasing the extent of the property from layer to layer.

The thickness of the individual layers of the gas diffusion electrode may be adjusted via the amount of powder mixture applied to the support and via the pressing forces. The amount of powder mixture applied may be adjusted e.g. via the thickness of the template laid on the support, enabling the powder mixture to be sprinkled onto the support. Compared with the processes known in the art, e.g., DE 101 48 599 A, the process according to the invention has the advantage that the thickness of the electrochemically active coating on the support can be adjusted independently of roller parameters such as roller diameter, roller gap, locking pressure and peripheral speed.

To minimize the force during pressing of the powder mixture with the support, in the range from 0.01 to 7 kN/cm, silver can be added to the powder mixture in the form of powder or in the form of flakes, scales or the like. Particularly advantageously, silver is used for this purpose in the form of powder with a particle diameter of less than 50 µm. The content of silver flakes in the powder mixture is preferably at most 15 wt. %. Mixtures of different silver powders can also be added, making it possible to increase the electrochemical activity. This is observed in a lower electrolysis voltage. It is particularly advantageous to use a type of silver powder which does not adversely affect the property of the powder mixture, e.g., in respect of flowability, or the mechanical properties of the electrode, but improves the electrochemical properties of the electrode, e.g. the conductivity or electrochemical activity.

The gas diffusion electrodes manufactured by the process according to the invention are particularly suitable for the electrolysis of a sodium chloride solution using the gas diffusion electrode as the cathode. Such a process for the electrolysis of a sodium chloride solution using a gas diffusion electrode as the cathode is known, e.g., from DE 44 44 114 A.

EXAMPLE 3.5 kg of a powder mixture made of 7 wt. % of PTFE powder, 88 wt. % of silver (I) oxide and 5 wt. % of type 331 silver powder from Ferro were mixed at a speed of rotation of 6000 rpm in a type R02 mixer from Eichrich, equipped with a star turbulator as mixing element, so that the temperature of the powder mixture did not exceed 55° C. This was achieved by interrupting the mixing process and allowing the powder mixture to cool down. Mixing was effected a total of three times. After mixing, the powder mixture was compacted by means of a roller press with a force of 0.6 kN/cm. The scabs obtained were mixed again in three mixing processes using an Eichrich mixer, the mixing temperature not exceeding 55° C. After mixing, the powder mixture was passed through a sieve of mesh size 1.0 mm. The sieved powder mixture was then applied to an electrically conducting support. The support was a nickel gauze with a wire thickness of 0.14 mm and a mesh size of 0.5 mm. The application was carried out with the aid of a 2 mm thick template, the powder being applied using a sieve of mesh size 1.0 mm. Excess powder protruding beyond the thickness of the template was removed by means of a stripper. After removal of the template, the support was pressed with the applied powder mixture by means of a roller press with a force of 0.5 kN/cm. The gas diffusion electrode was taken out of the roller press.

The gas diffusion electrode manufactured in this way was used in the electrolysis of a sodium chloride solution. The cell voltage was 2.10 V for a current density of 4 kA/m$^2$, an electrolyte temperature of 90° C. and a sodium chloride concentration of 32 wt. %.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the manufacture of an electrode consisting essentially of:
   (a) preparing a powder mixture consisting essentially of a silver catalyst containing silver (I) oxide and a binder, each in the form of a powder, by mixing the silver catalyst and the binder at a temperature of 35 to 80° C.,
   (b) sprinkling the powder mixture unto an electrically conducting support, and
   (c) pressing the powder mixture with the electrically conducting support, wherein the pressing is effected with a force of from about 0.01 to about 7 kN/cm, and wherein the electrode is a gas diffusion electrode.

2. The process according to claim 1, wherein the pressing is effected by rollers.

3. The process according to claim 1, wherein the mixing of the silver catalyst and the binder and optionally other components in a mixer in which mixing elements of the mixer rotate at a speed of from about 4000 to about 8000 rpm or about 10 to about 30 m/s.

4. The process according to claim 3, wherein the mixing is conducted at a temperature of 40 to 55° C.

5. The process according to claim 1, wherein the binder contains polytetrafluoroethylene (PTFE).

6. The process according to claim 1, wherein the electrically conducting support is selected from gauze, non-woven fabric, foam, woven fabric, net or expanded metal.

7. The process according to claim 6, wherein the electrically conducting support is the expanded metal and is selected from nickel, silver or silvered nickel.

8. The process according to claim 1, wherein the silver catalyst comprises silver(I) oxide, and optionally silver metal powder, and the binder is polytetrafluoroethylene (PTFE), and wherein the powder mixture consists essentially of 70 to 95 wt. % of the silver(I) oxide, 0 to 15 wt. % of the silver metal powder, and 3 to 15 wt. % of the PTFE.

9. The process according to claim 8, wherein the electrically conducting support is a nickel gauze with a wire diameter of 0.1 to 0.3 mm, and a mesh size of 0.2 to 1.2 mm.

10. The process according to claim 1, wherein the electrically conducting support is a nickel gauze with a wire diameter of 0.1 to 0.3 mm, and a mesh size of 0.2 to 1.2 mm.

11. The process according to claim 10, wherein the sprinkling of the powder mixture onto the electrically conducting support includes sprinkling through a sieve.

12. A process for the manufacture of an electrode consisting essentially of:
   (a) preparing a dry powder mixture consisting of a silver catalyst and a binder that includes polytetrafluoroethylene (PTFE), each in the form of powder, by mixing the silver catalyst and the binder at a room temperature of 14 to 23° C., and the silver catalyst comprises 70 to 95 wt. % of the silver(I) oxide, and 0 to 15 wt. % of silver metal powder,
   (b) sprinkling the powder mixture onto an electrically conducting support, the support selected from gauze, non-woven fabric, foam, woven fabric, net or expanded metal, and
   (c) pressing the powder mixture with the electrically conducting support, wherein the electrode is a gas diffusion electrode.

13. A process for the manufacture of an electrode comprising
   preparing a first dry powder mixture consisting of a silver catalyst and a binder, each in the form of powder, by mixing the silver catalyst and the binder at a temperature of 35 to 80° C., wherein the silver catalyst comprises 70 to 95 wt. % of the silver(I) oxide, and 0 to 15 wt. % of silver metal powder, and the binder includes polytetrafluoroethylene (PTFE),
   preparing a second dry powder mixture consisting of a silver catalyst and a binder, each in the form of powder, by mixing the silver catalyst and the binder at a temperature of 35 to 80° C., wherein the binder includes polytetrafluoroethylene (PTFE), and the percent by weight of binder in the second powder is greater than the percent by weight of the first powder,
   sprinkling the first powder mixture onto an electrically conducting support,
   sprinkling the second powder mixture onto the electrically conducting support, the support selected from gauze, non-woven fabric, foam, woven fabric, net or expanded metal, and pressing the applied powder mixtures with the electrically conducting support effected by rollers, wherein the pressing is effected with a force of from about 0.01 to about 7 kN/cm, and wherein the electrode is a multi-layer gas diffusion electrode.

14. The process according to claim 13, wherein the sprinkling of the second powder onto the electrically conducting support precedes the sprinkling of the first second powder.

\* \* \* \* \*